United States Patent Office 3,150,822
Patented Sept. 29, 1964

3,150,822
SEALING AND CENTERING DEVICE
FOR ROTARY SHAFT
Gaspard Paul Dreyfus, Antony, André Ertaud, Paris, Jean Friberg, Bourg-la-Reine, Robert Galley and Roger Julia, Paris, and Jacques Panossian, Chaville, France, assignors to Commissariat a l'Energie Atomique
Filed Feb. 6, 1962, Ser. No. 171,430
Claims priority, application France, Feb. 9, 1961, 852,234; June 6, 1961, 864,022
9 Claims. (Cl. 230—118)

The present invention relates to a sealing and centering device for a rotary shaft at the point of passage of the said shaft through a wall.

It is old in the art to employ as a sealing device between a rotating shaft and a wall a seal which is constructed on the principle of the Holweck rotary molecular vacuum pump; this device comprises a stator which is concentric with the shaft, while either the shaft or the stator is provided with helical grooves of suitable direction and variable depth. Unfortunately this type of joint works correctly only if the pressure to which it is subjected is slight.

It is also old in the art to employ as a centering device the so-called "fluid" bearings in which a film of a gas such as air replaces the lubricant between a shaft journal and a fixed sleeve. But this type of bearing entails the presence of a difference of pressure which is capable of maintaining a film of gas between the shaft journal and the sleeve.

The present invention is concerned with the design of a sealing and centering device which overcomes the disadvantages of the two devices referred to above and combines the advantages thereof. This device makes use of a seal of the "Holweck" type and a fluid bearing which both take part in providing a fluid-tightness, while the fluid bearing reduces the difference of pressure below which the seal must work at a value which is compatible with the operation of the latter.

The sealing and centering device for a rotary shaft at the point of passage of the said shaft through a partition which separates two enclosures subjected to different pressures and in accordance with the present invention comprises a fluid bearing located between the shaft and the partition, a joint constituting a molecular rotary pump with helical grooves and disposed between the said shaft and the said partition, in series with the bearing and on that side of the shaft which passes into the lower-pressure enclosure, and means for drawing the fluid by suction round the shaft between the joint and the bearing so as to absorb leakages through the said bearing.

The present invention is also concerned with rotary molecular pumps which are provided with sealing and centering devices in accordance with the invention; these pumps, whether they are of the Holweck type or the Siegbahn type, present a certain number of problems since the shafts of these pumps must be guided with precision by bearings or roller-bearings which, if these latter are located in the interior of the pump chamber, have to work in vacuo; and it has accordingly already been proposed to employ as a sealing device for a pump of this type a seal which is constructed on the same principle. The present invention proposes a pump in which the operation of a seal of the above described type is rendered possible as a result of the use of gas bearings which seal-off the seal from the surrounding atmosphere and insure precise centering of the shaft.

The invention will now be understood from the perusal of the description which follows below with reference to two forms of embodiment of the said invention which are given solely by way of example without any limitation being implied. Reference is made in the description to the accompanying drawings, in which.

Figure 1:
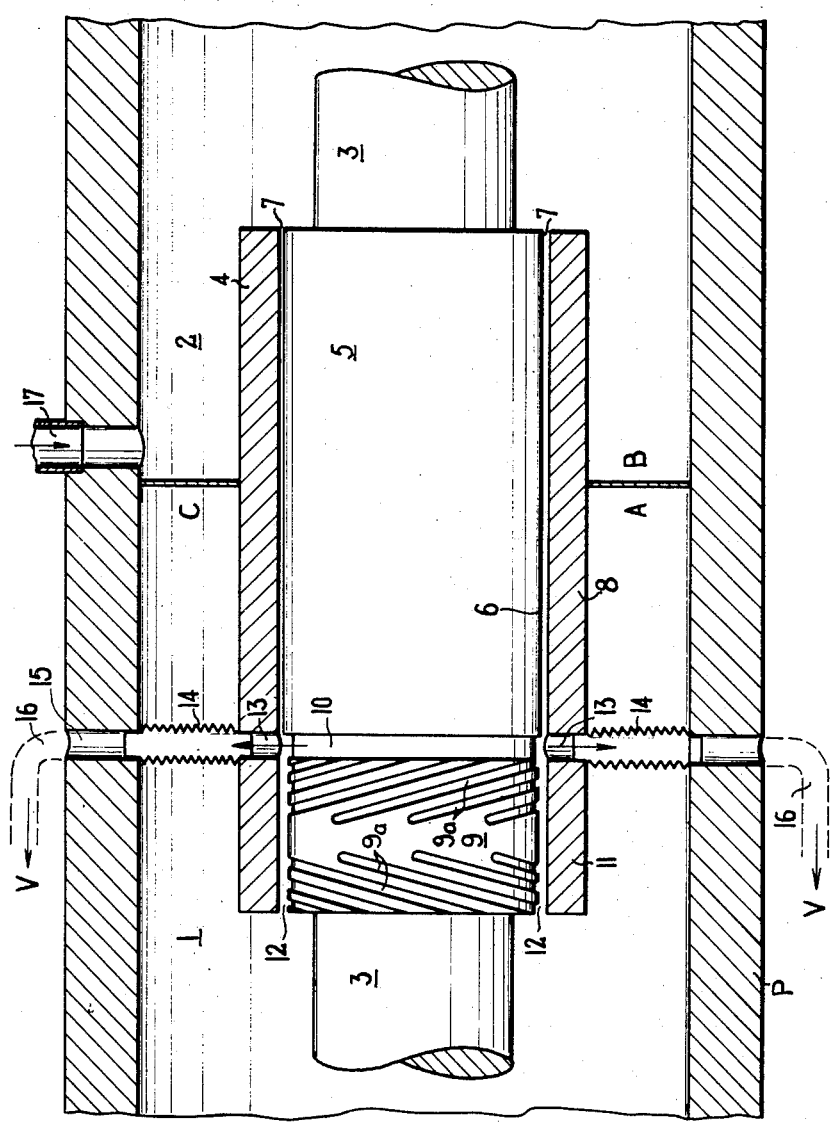
FIG. 1 is a diagrammatic view in axial cross-section of a sealing and centering device constituting a first embodiment of the invention.

The device which is illustrated in FIG. 1 is arranged inside a partition C located between two enclosures A and B respectively occupied by a gas under low pressure which is designated by the reference 1, and which can be aggressive and/or radioactive (uranium hexafluoride $UF^6$ for example) and a gas which is designated by the reference 2 and the pressure of which is close to atmospheric pressure (clean air or pure neutral gas, for example).

A rotary shaft 3 passes through the partition C which is usually constituted by a thin metallic diaphragm held by a self-aligning wall P; the said shaft is, for example, the shaft of a compressor for the circulation of hexafluoride. Perfect fluid-tightness must be ensured along the said shaft so as to prevent any leakage between the two enclosures A and B. To this end, a sleeve 4 passes in a perfectly fluid-tight manner through the diaphragm C and serves as a bearing-bush for a rotor 5 which is mounted in fluid-tight manner on the shaft 3, or which forms a single piece with the latter; a very small clearance 7, of the order of a few hundredths of a millimetre, for example, is provided between the shaft-journal 6 and that portion of the sleeve which is located opposite to the said journal.

The shaft is additionally provided with a "sealing element" 9 of lesser length than the shaft-journal 6 and separated from the latter by a groove 10; the said sealing element rotates inside a portion 11 of the sleeve 4. There are formed in the said sealing element 9 two sets of helical grooves 9a of opposite pitch, each groove having one or preferably a number of threads, while the width, the depth and the pitch of the said grooves are determined as a function of the clearance, of the speed, of the nature of the gases, of the temperature, of the leakages and of the pressures to be maintained. It suffices to recall that each of the sets of helical grooves 9a which are machined in the sealing element 9 has a depth which progressively decreases from the central zone of the sealing element towards the ends of this latter. Instead of being provided in the sealing element, the grooves could in any case be formed in the portion 11, and the groove 10 could be replaced by an annular chamber in the sleeve 4.

The clearance 12 between the most prominent portions of the sealing element 9 and the portion 11 of the sleeve 4 is preferably greater than the clearance 7 of the bearing formed by the shaft-journal 6 and the portion 8 of the said sleeve.

The groove 10 into which open the clearances 7 and 12 communicates with orifices 13 which provide a passage through the wall of the sleeve 4; the said orifices 13 are connected by means of flexible pipes 14 to orifices 15 which provide a passage through the wall P of the enclosure A, and which are connected by means of suction pipes 16 to a vacuum circulating-pump V which has not been illustrated in the drawings.

The enclosure B is supplied with the gas designated by the reference 2, for example through an opening 17.

The combined assembly of the elements 6 and 8 constitutes a gas bearing which is both supplied with the gas 2 through the enclosure B and evacuated by the vacuum circulating-pump V through the clearance 7, the gas thereby ensuring the self-centering of the rotor.

Similarly, the elements 9 and 11 constitute a grooved rotary seal of the type described in the French Patent No. 1,166,292 or in its first Certificate of Addition No. 74,177.

The rate of flow through the clearance 7 is very low, even when the pressure is of the order of one atmosphere in the chamber B and of a low value (20 millimetres of mercury, for example) in the groove 10. The rotary seal is accordingly located between two low-pressure gases 1 and 2, with the result that, under its normal conditions of operation, the said rotary joint forces the gas 1 and the gas 2 respectively into the enclosure or chamber A and into the groove 10 which is connected to the circulating-pump V.

By way of non-limitative example, devices having the following characteristics have been constructed:

| | |
|---|---|
| Diameter of the rotor 5 | 100 to 120 mm. |
| Length of the shaft-journal 6 | 200 to 240 mm. |
| Length of the sealing element 9 | 60 to 70 mm. |
| Clearance 7 of the bearing (along one radius) | 0.025 to 0.035 mm. |
| Clearance 12 of the rotary seal (along one radius) | 0.04 to 0.06 mm. |
| Peripheral speed | 70 to 100 m./sec. |
| Rate of flow of gas through bearing | 0.2 g./sec. |
| Pressures at A | 20 to 30 mm. of mercury. |
| Leakages through seal | $10^{-6}$ g./sec. |

There is thus formed a sealing element having a small bulk and very low leakage values; if it is desired to give a priority of leakage to one of the gases to be sealed-off, the counter-diffusion can be made even lower than the leakages ($10^{-8}$ g./sec. and $10^{-6}$ g./sec., for example).

Instead of taking place through the orifices 13, the suction can be carried into effect through the shaft itself by means of a longitudinal axial passage formed inside the shaft 3, the said passage communicating either with the groove 10 or through radial passages with the clearance 7.

It can be seen that the device in accordance with the invention provides a remedy for the disadvantages of the seal as employed alone. Whereas it is known that this latter type of joint operates correctly only on condition that the pressures of the two enclosures between which the said seal is located are low, the device which has just been described is capable of operating with substantial differences between the pressures of the two enclosures, inasmuch as the gas bearing constitutes an expansion labyrinth which allows the seal to operate under the low fore-pressure which is required while the bearing itself operates at a sufficiently high pressure to enable it to withstand a substantial load; the grooved rotary seal itself has only a small length, which is always desirable for reasons of overall bulk and machining.

It is thus possible to provide a sealing device between two enclosures separated by a wall or partition through which passes a rotary shaft, one of the said enclosures being under very low pressure while the other enclosure is subjected to a pressure of the order of atmospheric pressure.

Lastly, inasmuch as the rate of flow of gas inside the labyrinth which is constituted by the bearing is very low by reason of the small clearance of the bearing, the whole unit requires only a small vacuum circulating-pump.

Figure 2:
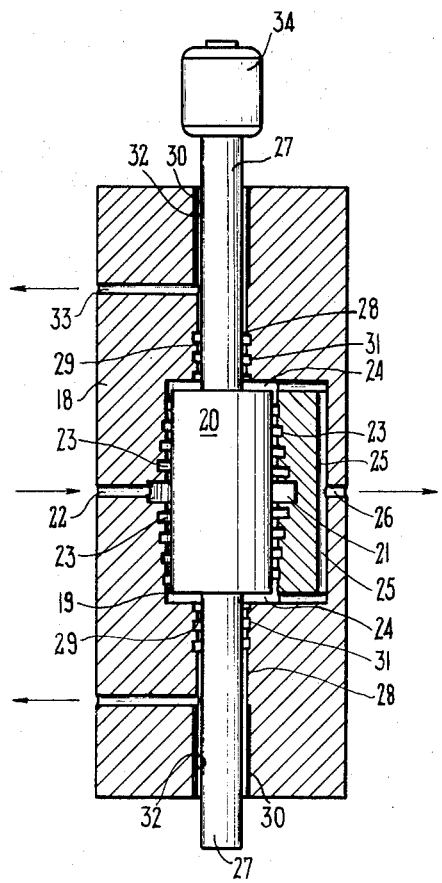
FIG. 2 is a diagrammatic view in longitudinal cross-section of a Holweck pump provided with a device constituting a second embodiment of the invention.

The molecular pump which is illustrated in FIG. 2 is of the Holweck type. This pump comprises a body 18 forming a stator in the interior of which there is formed a cylindrical chamber 19, inside which a rotor 20 which is also cylindrical is adapted to rotate. The stator 18 must obviously be composed of a number of parts in order to permit assembly. By way of example, the rotor 20 can have a diameter of 200 millimeters and a useful length of 450 millimeters, the radial clearance between the rotor 20 and the walls of the chamber 19 being approximately 0.2 mm. A series of helical grooves 23 are formed in the said walls on each side of a central annular chamber 21 into which opens an admission pipe 22 designed to be connected to the vessel which has not been shown in the drawings and in which it is intended to create the vacuum, the said helical grooves 23 forming as it were, a multiple-thread tapping and opening on the one hand into the central annular chamber 21 and, on the other hand, into a terminal back-flow chamber 24. In the example which has been illustrated, the width of the grooves 23 is 40 millimeters, the width of the projecting portion located between two adjacent turns is 2 millimeters, while the angle of slope of the grooves with respect to a plane at right angles to the longitudinal axis of the rotor is 28° and the depth of the said grooves decreases progressively from 10 millimeters at the point of departure from the annular chamber 21 to 2 millimeters at the point at which the grooves terminate inside the chambers 24. Into each of the said chambers 24 there opens a back-flow pipe 25 leading to a common pipe 26 which is coupled to the suction side of a fore-vacuum pump which has not been illustrated in the drawings.

The use of a series of helical grooves 23 which are intercalated with each other and form as it were a multiple-thread screw, instead of the use of a single groove, has for its object to increase the output of the pump. Rates of delivery are accordingly reached which can be of the order of twenty times that of a Holweck pump of standard type and, moreover, the radial clearance between the rotor and stator of the pump can be increased until it reaches a multiple of the clearance which is necessary in a Holweck pump of the usual type, thereby greatly simplifying the problems of machining.

The rotor 20 is carried by a shaft 27 which has a diameter of 130 millimeters and which passes through two bores 28, shown as formed in the pump body on each side of the chamber 19, in fact the bores are machined in sleeves carried by diaphragms, as shown in FIG. 1.

The pump which has been described in the foregoing is of conventional type. Up to the present time, the shaft 27 of a pump of this type was mounted on two precision ball bearings and the driving of the said shaft was carried out by an asynchronous motor, the rotor of which was mounted at the end of the pump-shaft and was separated from the stator by a thin fluid-tight bell-housing. Thus the whole of the rotating portion was entirely under a vacuum. This assembly provided good fluid-tightness since the entire rotating portion of the pump was located in a vacuum but it made impossible any access to the rotor of the pump-driving motor and involved the disadvantage of requiring the ball-bearings to work in vacuo, thereby creating serious problems of lubrication since the introduction of oil or grease would have produced vapours which would have prevented the possibility of achieving high vacua.

The pump which is illustrated in the drawings is on the contrary provided with a sealing and centering device in accordance with the invention.

The seal 29 is constituted by one or a number of helical grooves 31 which are formed in the wall of the bore 28 and which progress in the direction of rotation of the shaft 27, from the corresponding chamber 24 towards the exterior; the length of the joint is, for example, 50 millimeters, the width of the grooves is 1 millimeter, the width of the projecting portion between two adjacent turns is 1 millimeter, while the angle of slope of the groove with respect to a plane at right angles to the longitudinal axis of the shafe is 13°; the depth of the grooves progressively decreases from the chamber 24 to the exterior, from 0.5 mm. to 0.1 mm. The clearance between the shaft 27 and the bore 28 is 0.05 mm.

The fluid bearing is formed by the internal smooth wall 32 of the bore 28 working in combination with the shaft 27, the radial clearance between the two elements being 0.05 mm. over a distance of 160 mm.

A pipe 33 opens into the bore 28 between the seal 29 and the fluid bearing 30, and is intended to be connected to a fore-vacuum pump which can be the same as that to which is connected the return pipe 26 to the pump; the said pipe 33 serves to establish between the seal 29 and the bearing 30 the low pressure (of a few tenths of a millimeter) which is necessary for the correct operation of the said joint and the said bearing.

The shaft 27 is driven at high speed for example 11,000 revolutions per minute, by an external motor 34 fitted with thrust bearings. The vacuum which is produced by the fore-vacuum pump being of the order of $10^{-2}$ to $10^{-3}$ mm. Hg, vacua higher than $10^{-8}$ mm. Hg can be achieved by virtue of the pump which has just been described.

It is possible, if so desired, to completely eliminate the back-flow conduits 25 to the pump and to employ the suction pipes 33 in their place.

In order to facilitate the execution thereof, the grooves 23 of the pump proper, instead of being formed in the stator 18, can either be machined in the rotor 20 or in both stator and rotor at the same time, in which case the direction of pitch must be opposite in the case of the rotor.

Similarly, the grooves 31 of the joint 29 can be formed either in the shaft 27 or alternatively in the internal wall of the chamber 19; the said grooves can even be cut in the flat end wall of the rotor 20, while the back-flow chambers 24 are in that case constituted by annular grooves formed in the pump body between the region of the grooves 23 and that of the grooves 31; the joint then has a structure which is similar to that of the Siegbahn pump or Gondet pump.

It will be obvious to those skilled in the art that the sealing and centering device which has been described in connection with a Holweck type pump may be embodied in any type of rotating molecular pump.

We claim:

1. In a sealing and centering device for a rotatable shaft, a rotatable shaft, a first high pressure space, a second lower pressure space, a fixed wall separating said first higher pressure space and said second lower pressure space, first and second portions of said shaft disposed in that order from said first to said second space, first and second sleeves in said wall confronting said first and second portions, respectively, means for establishing a pressure close to said lower pressure between said first and second sleeves, and helical groove means formed in one at least of said second portion and sleeve, said first portion and sleeve being smooth and separated by a clearance, and said second portion and sleeve being separated by another predetermined clearance.

2. A sealing device according to claim 1, wherein said helical groove means comprises two sets of grooves of opposite pitches in one at least of said second portion and sleeve, said two sets being located at a distance along the axis of said shaft.

3. A sealing device according to claim 1, having a circumferential groove formed in said shaft between said first and second portions and passage means connecting said groove to said pressure means.

4. A sealing device according to claim 1, having a counterbore formed in said fixed wall between said first and second sleeves and passage means connecting said counterbore to said pressure means.

5. A sealing device according to claim 1, having passage means in said wall connected to said pressure means and opening between said first and second sleeves.

6. A sealing device according to claim 1, having passage means in said shaft connected to said pressure means and opening between said first and second portions.

7. In combination with a vacuum pump including a stator, an internal chamber in said stator, a rotor in said chamber and rotatable shaft means carrying said rotor and projecting through said stator to the atmosphere, a sealing and centering device between said shaft on each side of said rotor stator and comprising: first and second portions of said shaft disposed in that order from said chamber to atmosphere, first and second surfaces in said stator confronting said first and second portions, respectively, means for establishing a pressure lower than atmosphere pressure between said first and second surfaces, groove means formed in one at least of said second portion and surface, said groove means being constructed and arranged as to draw air from said chamber, said first portion and surface being smooth and separated by a predetermined clearance, and said second portion and surface being separated by another predetermined clearance, an inlet passage into said chamber opening midway of said rotor and an outlet passage from said chamber opening adjacent the ends of said rotor.

8. The combination according to claim 7, wherein said second portion and surface are cylindrical and said groove means comprises one set of grooves in one at least of said second portion and surface.

9. In combination with a stator, an internal chamber in said stator, a rotor in said chamber, rotatable shaft means carrying said rotor and projecting through said stator to the atmosphere, a sealing and centering device between said shaft and said stator on each side of said rotor comprising first and second portions of said shaft disposed in that order from said chamber to atmosphere, first and second surfaces in said stator confronting said first and second portions, respectively, outlet means through said stator establishing a pressure lower than atmospheric pressure betwen said first and said second surfaces, and groove means formed in one at least of said second portion and surface, said groove means being constructed and arranged as to draw air from said chamber, said first portion and surface being smooth and separated by a predetermined clearance, and said second portion and surface being separated by another predetermined clearance.

References Cited in the file of this patent

UNITED STATES PATENTS

| | | |
|---|---|---|
| 2,014,859 | Mitchell | Sept. 17, 1935 |
| 2,444,100 | Hill | June 29, 1948 |
| 2,457,088 | Pinney | Dec. 21, 1948 |
| 2,458,068 | Fuller | Jan. 4, 1949 |
| 2,920,347 | Joukainen et al. | Jan. 12, 1960 |

FOREIGN PATENTS

| | | |
|---|---|---|
| 781,505 | Great Britain | Jan. 31, 1955 |
| 820,348 | Great Britain | July 23, 1957 |